July 10, 1962     W. B. PEGRAM     3,044,029
TRANSDUCER
Filed Jan. 12, 1961     2 Sheets-Sheet 1

*INVENTOR.*
WILLIAM B. PEGRAM
BY
Donald S. Cohen
ATTORNEY

July 10, 1962 W. B. PEGRAM 3,044,029
TRANSDUCER
Filed Jan. 12, 1961 2 Sheets-Sheet 2

INVENTOR.
WILLIAM B. PEGRAM
BY
Donald S. Cohen
ATTORNEY

United States Patent Office 3,044,029
Patented July 10, 1962

3,044,029
TRANSDUCER
William B. Pegram, Swarthmore, Pa., assignor to International Resistance Company, Philadelphia, Pa.
Filed Jan. 12, 1961, Ser. No. 82,294
17 Claims. (Cl. 336—30)

The present invention relates to a transducer, and more particularly to a differential pressure transducer.

In pressure transducers, it is common to use a bellows type diaphragm to operate some type of electrical component having a variable output, such as a variable resistor or a differential transformer. In such bellows operated transducers, a change in the pressure applied to the bellows varies the length of the bellows, which in turn operates the electrical component to vary the output of the component. Thus, a variation in the output of the electrical component is directly proportional to the change in the length of the bellows. Therefore, to obtain a large variation in the output of the electrical component normally requires a large change in the length of the bellows.

When measuring or controlling small changes in pressure, it is desirable to obtain a large change in the output of the electrical component for a small change in the pressure to achieve a more accurate measurement of, and a finer control for the pressure. For this purpose it is necessary to use a bellows diaphragm which will provide a large variation in its length for a small change in pressure applied to the diaphragm. To function in this manner, the bellows would have to be either long and of a thin metal, or large in diameter. However, such long bellows are physically unstable so that they are difficult to use. Also, such bellows are readily susceptible to be changed in size by outside forces applied to the transducer, such as by gravity, vibration and shock upon movement of the transducer. Thus, such outside forces can easily provide undesirable changes in the output of the transducer.

It is an object of the present invention to provide a novel transducer.

It is another object of the present invention to provide a novel differential pressure transducer.

It is still another object of the present invention to provide a differential pressure transducer utilizing small bellows diaphragms which will provide a large output for a small change in pressure.

It is a further object of the present invention to provide a differential pressure transducer utilizing bellows diaphragms in which the output of the transducer is not affected by outside forces applied to the transducer.

Other objects will appear hereinafter.

For the purpose of illustrating the invention there is shown in the drawings a form which is presently preferred; it being understood, however, that this invention is not limited to the precise arrangements and instrumentalities shown.

Figure 1:
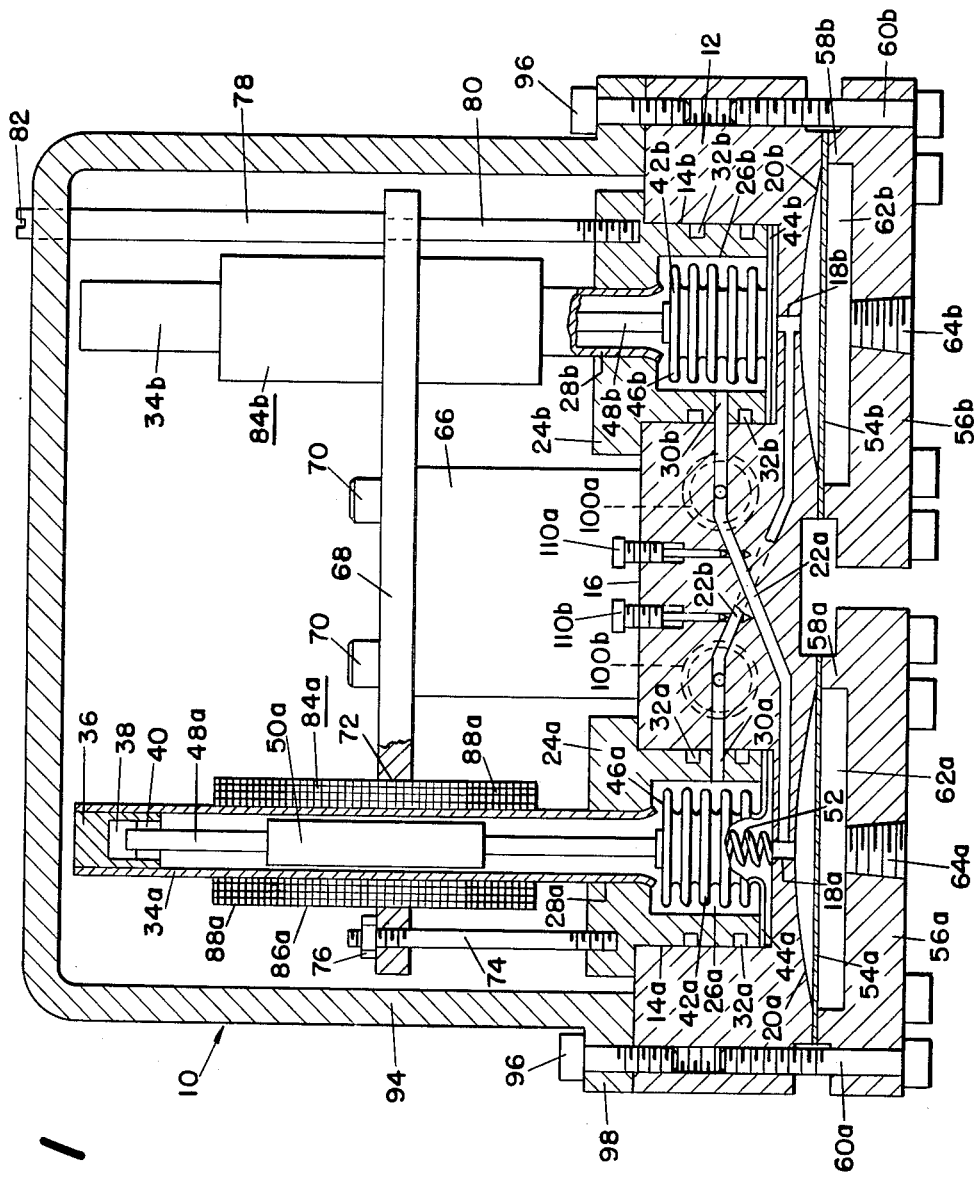
FIGURE 1 is a sectional view, partially in elevation, of the differential pressure transducer of the present invention.

Referring initially to FIGURE 1, the differential pressure transducer of the present invention is generally designated as 10.

Transducer 10 comprises a relatively flat base plate 12 having a pair of spaced, cylindrical cavities 14a and 14b in the top surface 16 thereof. A relatively small diameter hole 18a extends through the base plate 12 from the bottom of the cavity 14a to the bottom surface of the base plate 12, and a similar hole 18b extends through the base plate 12 from the bottom of the cavity 14b to the bottom surface of the base plate. The bottom surface of the base plate 12 has a pair of spaced, rounded, shallow cavities 20a and 20b therein. Each of the cavities 20a and 20b extends across a separate one of the holes 18a and 18b. The base plate 12 is provided with a small diameter passage 22a extending from the hole 18a to the side of the cavity 14b. A similar passage 22b extends through the base plate 12 from the hole 18b to the side of the cavity 14a.

A cylinder 24a fits into the cavity 14a in the base plate 12. The cylinder 24a has a cylinder chamber 26a extending from its bottom end, and an opening 28a extending therethrough from the top of the cylinder chamber 26a to the top end of the cylinder 24a. The cylinder 24a also has a passage 30a extending radially therethrough from its outer surface to the cylinder chamber 26a. The passage 30a is positioned so that it is in alignment with the end of the passage 22b in the base plate 12. A pair of packing rings 32a extend around the cylinder 24a above and below the passage 30a. The packing rings 32a seal the space between the outer surface of the cylinder 24a and the wall of the cavity 14a, and seal the junction between the passage 30a and the passage 22b. A cylinder 24b, similar to the cylinder 24a, fits in the cavity 14b in the base plate 12. The cylinder 24b has a chamber 26b extending from the bottom thereof, and an opening 28b extending from the top of the chamber 26b to the top surface of the cylinder. The cylinder 24b also has a passage 30b extending radially therethrough to the chamber 26b, which passage 30b is in alignment with the end of the passage 22a in the base plate 12. A pair of packing rings 32b extend around the cylinder 24b above and below the passage 30b.

An elongated tubular sleeve 34a of a non-magnetic material, such as an annealed non-magnetic stainless steel, has its bottom end fitting in the opening 28a in the cylinder 24a, and is tightly secured to the cylinder 24a. A cap 36 fits in the top end of the sleeve 34a, and is tightly secured to the sleeve. The cap 36 has a recess 38 in its bottom end, and a sleeve bearing 40 is secured in the recess 38. The sleeve bearing 40 has longitudinal slots therethrough which provide communication between the interior of the recess 38 above the bearing 40 and the interior of the sleeve 34a. An elongated, tubular sleeve 34b, similar to the sleeve 34a, has its bottom end fitting into the opening 28b in the cylinder 24b, and is secured to the cylinder 24b. The top end of the sleeve 34b is closed by a cap containing a sleeve bearing similar to the cap 36 with its bearing 40.

A small bellows diaphragm 42a having an open bottom end 44a and a closed top end 46a is within the chamber 26a of the cylinder 24a. The open end 44a of the bellows 42a extends across and is hermetically sealed to the bottom end of the cylinder 24a. Thus, the bellows 42a provides the bottom of a hermetically sealed chamber which includes the space within the cylinder 26a around the bellows 42a and the interior of the sleeve 34a. An elongated rod 48a of a non-magnetic material is within the sleeve 34a. The bottom end of the rod 48a is secured to the top end 46a of the bellows 42a, and the top end of the rod 48a is slidably supported in the sleeve bearing 40. The rod 48a is of a length to permit axial movement of the rod within the sleeve 34a upon expansion and contraction of the bellows 42a. An armature core 50a of a magnetic metal is within the sleeve 34a. The armature core 50a surrounds and is secured to the rod 48a. Thus, axial movement of the rod 48a also moves the armature core 50a axially within the sleeve 34a. A helical spring 52 may be provided within the bellows diaphragm 42a. The spring 52 is seated between the inner surface of the top end 46a of the bellows 42a and the bottom of the cavity 14a. The spring 52 sets the design pressure range of the bellows 42a by adding an additional force against which the pressure must act.

A small bellows diaphragm 42b, similar to the bellows diaphragm 42a, is within the chamber 26b of the cylinder 24b. The open end 44b of the bellows 42b extends across and is sealed tightly to the bottom end of the cylinder 24b so that the bellows 42b forms the bottom of a chamber which includes the space within the cylinder chamber 26b around the bellows 42b and the interior of the sleeve 34b. An elongated rod 48b of a non-magnetic material, similar to the rod 48a, is within the sleeve 34b. The bottom end of the rod 48b is secured to the top end 46b of the bellows 42b, and the top end of the rod 48b is slidably supported in the bearing in the cap which closes the sleeve 34b. An armature core 50b of a magnetic material, similar to the armature core 50a, surrounds the rod 48b and is secured thereto within the sleeve 34b (see FIGURE 3). A helical spring (not shown), like the spring 52, may be provided within the bellows diaphragm 42b.

A flat diaphragm 54a extends across the shallow cavity 20a in the bottom surface of the base plate 12. A cover plate 56a extends across the bottom surface of the flat diaphragm 54a. Cover plate 56a has a cylindrical flange 58a projecting upwardly from the top surface thereof, and engaging the peripheral portion of the bottom surface of the diaphragm 54a. Bolts 60a extend through the cover plate 56a and are threaded into holes in the base plate 12 to secure the cover plate 56a to the base plate 12, and to clamp the peripheral portion of the diaphragm 54a tightly between the flange 58a and the bottom of the base plate. The flange 58a of the cover plate 56a provides a recess 62a across the top of the cover plate 56a and beneath the flat diaphragm 54a to permit flexing of the diaphragm. The cover plate 56a has an inlet port 64a therethrough opening into the recess 62a.

A flat diaphragm 54b extends across the shallow cavity 20b in the bottom of the base plate 12. A cover plate 56b having a cylindrical flange 58b projecting upwardly from its top surface extends across the bottom surface of the diaphragm 54b with the flange 58b engaging the peripheral portion of the bottom surface of the diaphragm 54b. Bolts 60b extend through the cover plate 56b and are threaded into holes in the base plate 12 to secure the cover plate 56b to the base plate, and to clamp the peripheral portion of the diaphragm 54b tightly between the flange 58b and the bottom surface of the base plate 12. The flange 58b of the cover plate 56b provides a recess 62b across the top of the cover plate 56b and beneath the diaphragm 54b to permit flexing of the diaphragm. The cover plate 56b has an inlet port 64b therethrough opening into the recess 62b.

A mounting post 66 is secured to the top surface 16 of the base plate 12 between the cavities 14a and 14b in the top of the base plate, and projects upwardly from the base plate 12. A mounting plate 68 is secured to the top of the mounting post 66 by screws 70. The mounting plate 68 is substantially parallel to and spaced from the top surface 16 of the base plate 12, and extends over the cavities 14a and 14b in the base plate. The mounting plate 68 has a pair of holes 72 therethrough on opposite sides of the mounting post 66 through which the sleeves 34a and 34b extend. A rod 74 threaded at each of its ends, extends through the mounting plate 68 adjacent its left hand edge as viewed in FIGURE 1. The bottom end of the rod 74 is threaded into a hole in the top of the cylinder 24a. A nut 76 is threaded on the top end of the rod 74, and engages the top surface of the mounting plate 68. The rod 74 and the nut 76 secure the left hand end of the mounting plate 68, as viewed in FIGURE 1, from vibrating. An elongated adjustment rod 78 extends through the mounting plate 68 adjacent the right hand end of the mounting plate as viewed in FIGURE 1. The adjustment rod 78 has a smaller diameter portion 80 at its lower end, which small diameter portion 80 extends through a hole in the mounting plate with the shoulder formed by the smaller diameter portion seating on top of the mounting plate. The bottom end of the smaller diameter portion 80 of the adjustment rod 78 is threaded into a hole in the top of the cylinder 24b. The adjustment rod 78 has a transverse slot 82 across its top end into which a screw driver or similar tool can be inserted to rotate the adjustment rod. The adjustment rod 78 serves to bend the right hand end of the mounting plate 68 slightly for reasons which will be explained later.

Differential transformers, generally designated 84a and 84b, surround the sleeves 34a and 34b respectively. The differential transformers 84a and 84b each extends through and fits tightly in a separate one of the holes 72 in the mounting plate 68 so that the differential transformers are supported by the mounting plate. The differential transformers 84a and 84b are positioned along their respective sleeves 34a and 34b so that the differential transformers surround the armature cores 50a and 50b within the sleeves. The differential transformers 84a and 84b are each of the type shown in the United States Letters Patent No. 2,507,344, issued May 9, 1950, to W. D. Macgeorge, entitled "Differential Transformer." The differential transformers 84a and 84b each includes a central primary winding 86a and 86b respectively, and a pair of identical secondary windings 88a and 88b respectively wound along opposite sides of the primary winding. As shown in Patent No. 2,507,344, the primary and secondary windings are wound around a bobbin of a non-magnetic material. The differential transformers 84a and 84b are each provided with a cylindrical metal sleeve around the windings and the bobbin to protect the windings from being damaged, and to provide a magnetic shield for the windings.

Figure 3:
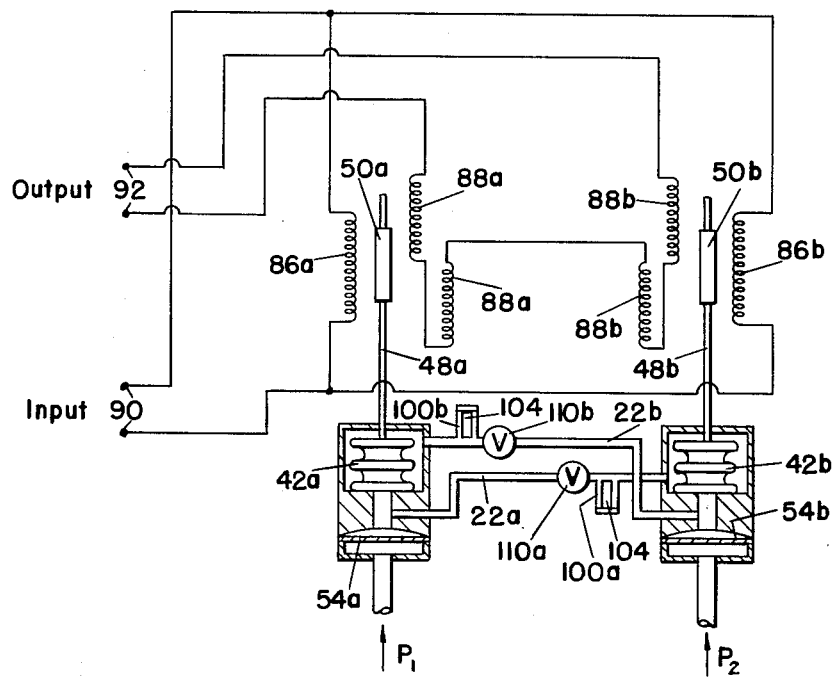
FIGURE 3 is a schematic diagram of the electrical circuit and the pressure circuit of the differential pressure transducer of the present invention.

Referring to FIGURE 3, the primary windings 86a and 86b of the transformers 84a and 84b are connected in parallel to the input terminals 90 of the transducer 10. The two secondary windings 88a of the transformer 84a are connected in series bucking relation, and the two secondary windings 86b of the transformer 84b are connected in series bucking relation. By series bucking relation it is meant that when a voltage is applied across the primary winding of the transformer, the voltage induced across one of the secondary windings is of a polarity opposite to the voltage induced across the other secondary winding. The two secondary windings 88a of the transformer 84a and the two secondary windings 88b of the transformer 84b are connected to the output terminals 92 of the transducer 10 so that the secondary windings 88a are in bucking series relation to the secondary windings 88b. The input terminals 90 and the output terminals 92 are suitable connectors which extend through and are electrically insulated from the base plate 12.

A cup-shaped cover 94 is mounted on the top surface 16 of the base plate 12. The cover 94 extends over the differential transformers 84a and 84b and all of the other parts mounted on and extending from the top of the base plate 12. Bolts 96 extend through a flange 98 which extends outwardly from the lip of the cover 94, and the bolts 96 are threaded into holes in the top surface of the base plate 12 to secure the cover 94 to the base plate. The top end of the adjustment rod 78 extends through a hole in the top of the cover 94 so that the adjustment rod is accessible to be rotated.

Figure 2:
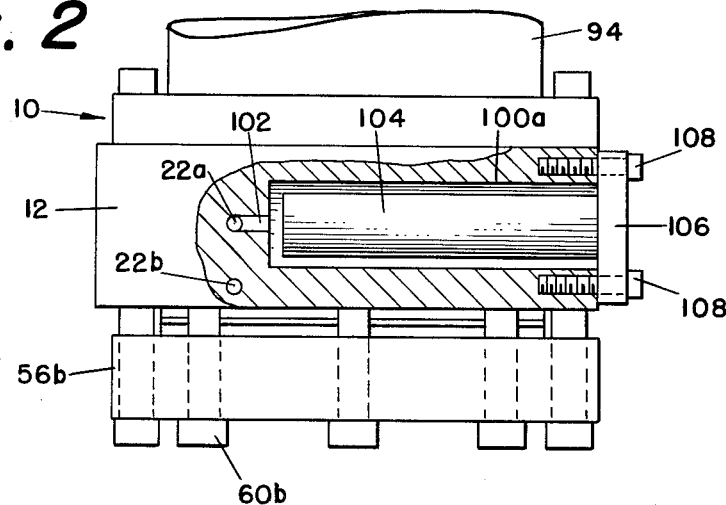
FIGURE 2 is a side elevational view, partially in section, of a portion of the differential pressure transducer of the present invention.

The base plate 12 is provided with a pair of spaced cavities 100a and 100b therein between the cavities 14a and 14b. As shown in FIGURE 2, the cavity 100a is cylindrical, and extends from an edge of the base plate 12 toward the passage 22a. A passage 102 extends through the base plate 12 from the closed end of the cavity 100a to the passage 22a so that the cavity 100a is in communication with the passage 22a. A cylindrical rod 104 of "Invar" metal is positioned within the cavity 100a. The rod 104 is secured at one end to a plate 106 which extends across the open end of the cavity 100a. The plate 106 is secured to the base plate 12 by screws 108. The plate 106 sealingly closes the cavity 100a, and supports the rod 104 so that the rod is centrally positioned within the cavity 100a. The cavity 100b is connected to the passage 22b by a passage, not shown. The cavity 100b, like the cavity 100a, contains a cylindrical rod of "Invar" metal which is mounted on a plate, not shown, similar to the plate 106.

The chambers formed around each of the bellows diaphragms 42a and 42b, the chamber formed between each of the bellows diaphragms 42a and 42b and its respective flat diaphragm 54a and 54b, the passages 22a and 22b, and the cavities 100a and 100b are all filled with a liquid, such as water. As clearly shown in FIGURE 3, the liquid within the cavity around the outside of the bellows diaphragm 42a, the liquid in the cavity formed between the bellows diaphragm 42b and the flat diaphragm 54b, and the liquid within the cavity 100b are in communication through the passage 22b. Likewise, the liquid in the chamber formed around the outside of the bellows diaphragm 42b, the liquid within the chamber between the bellows diaphragm 42a and the flat diaphragm 54a, and the liquid within the cavity 100a are in communication through the passage 22a. A pair of needle valves 110a and 110b extend through the base plate 12 to the passages 22a and 22b respectively. The needle valves 110a and 110b serve to control the flow of the liquid through the passages 22a and 22b to prevent surges of the flow of the liquid when sudden variations in pressure occur to the transducer 10.

The transducer 10 of the present invention operates as follows:

Considering first the operation of the differential transformer 84a, when an input voltage is applied across the primary winding 86a, and the armature core 50a is positioned so that it extends across the same number of turns of each of the secondary windings 88a, the voltage induced across each of the secondary windings 88a will be of equal magnitude, but of opposite polarity. Thus, the voltage across the secondary windings 88a will balance each other so that the output of the differential transformer 84a will be zero. This position of the armature core 50a is known as its null position. If the armature core 50a is moved upwardly from its null position, the armature core will then be extending across more turns of the upper secondary winding 88a and fewer turns of the lower secondary winding 88a. Therefore, the voltage induced across the upper secondary winding 88a will be greater than the voltage induced across the lower secondary winding 88a so that the output of the differential transformer 84a will be the difference between the voltages induced in the secondary windings 88a and of a polarity according to the direction of the turns of the upper secondary winding 88a. Likewise, if the armature core 50a moves downwardly from its null position, the voltage induced across the lower secondary winding 88a will be greater than that induced across the upper secondary winding 88a, so that the output of the differential transformer 84a will be the difference between the two voltages and of a polarity opposite to that produced when the voltage across the upper secondary winding is greater. The differential transformer 84b operates in the same manner as the differential transformer 84a. Thus, when the armature core 50b moves upwardly from its null position, an output voltage is provided across the secondary windings 88b of a polarity according to the direction of the turns of the upper secondary winding, and when the armature core 50b moves downwardly from its null position, an output voltage is produced which is of a polarity according to the direction of the turns of the lower secondary winding 88b.

Now considering both of the differential transformers 84a and 84b together, when both of the armature cores 50a and 50b are moved a uniform distance upwardly from their null positions, a voltage will be produced across each of the sets of secondary windings 88a and 88b of equal magnitude and of the same polarity. Likewise, when both of the armature cores 50a and 50b are moved downwardly the same distance from their null positions, a voltage will be produced across each pair of the secondary windings 88a and 88b of the same magnitude and of the same polarity. However, as previously stated, the secondary windings 88a of the transformer 84a are connected in series bucking relation to the secondary windings 88b of the transformer 84b. Thus, when the polarity of the outputs of both of the pairs of secondary windings 88a and 88b are the same, the bucking series connection between the two sets of secondary windings causes the outputs of the secondary windings to balance each other out. Therefore, equal movement of both of the armature cores 50a and 50b, either upwardly or downwardly, will produce a change in the outputs of the differential transformers 84a and 84b of equal magnitude and same polarity so that the changes will completely balance each other and produce no change across the output terminals 92 of the transducer 10. Unequal movement of the two armature cores 50a and 50b either upwardly or downwardly, will produce a change in the voltage across the output terminals 92 which is proportional to the difference in the movement of the armature cores. However, if the armature core 50a moves upwardly and the armature core 50b moves downwardly, or the armature core 50a moves downwardly and the armature core 50b moves upwardly, voltages will be induced across the secondary windings 88a and 88b of opposite polarity. Since the secondary windings 88a and 88b are connected in series bucking relation, the voltages across the secondary windings of opposite polarity will add together to provide a voltage across the output terminals 92 of the transducer 10 equal to the total of the output voltages across both the secondary windings 88a and 88b.

In the use of the transducer 10 of the present invention, the transformers 84a and 84b may be positioned on the mounting plate 68 with respect to the armature cores 50a and 50b so that when the pressures on opposite sides of the bellows diaphragms 42a and 42b are equal, the armature cores 50a and 50b will be in their null positions. Since the chamber within the bellows diaphragm 42a is in communication with the chamber around the bellows diaphragm 42b, and since the chamber within the bellows diaphragm 42b is in communication with the chamber around the bellows diaphragm 42a, when equal pressures are on both sides of the bellows diaphragm 42a, equal pressures will also be on both sides of the bellows diaphragm 42b. With equal pressures on both sides of both of the bellows diaphragms 42a and 42b, the position of the armature core 50b with respect to the differential transformer 84b can be adjusted to correspond with the position of the armature core 50a with respect to the differential transformer 84a by means of the adjustment rod 78. Rotation of the adjustment rod 78 will cause a light bending of the right hand end of the mounting plate 68 to achieve slight longitudinal movement of the differential transformer 84b with respect to the armature core 50b. By assembling the transducer 10 with the right hand end of the mounting plate 68 being bent downwardly slightly, adjustment of the differential transformer 84b in either direction can be achieved by means of the adjustment rod 78.

With both of the differential transformers 84a and 84b being properly positioned with respect to the armature cores 50a and 50b respectively, the inlet port 64a of the transducer 10 can be connected to one source of pressure to be measured, and the inlet port 64b can be connected to another source of pressure. One of the inlet ports 64a and 64b can be left open to the atmosphere, or both of the inlet ports can be connected to different sources of pressure, such as on opposite sides of a Venturi in a flow line. If the pressure to the inlet port 64b remains constant, and the pressure to the inlet port 64a increases, the increase in pressure to the inlet port 64a will act on the flat diaphragm 54a to cause the flat diaphragm 54a to bend upwardly. The upward movement of the flat diaphragm 54a compresses the fluid in the chamber between the flat diaphragm 54a and the interior of the bellows diaphragm 42a. The compression of the fluid in the chamber between the flat diaphragm 54a and the interior of the bellows diaphragm 42a will cause some of the fluid to flow into and against the interior of the bellows diaphragm 42a, and the bellows diaphragm 42a will expand accordingly. Also, some of the compressed fluid will flow through the passage 22a to the chamber around the bellows diaphragm 42b, and thereby cause the bellows diaphragm 42b to contract. Expansion of the bellows diaphragm 42a moves the rod 48a and the armature core 50a upwardly, and contraction of the bellows diaphragm 42b moves the rod 48b and the armature core 50b downwardly. As previously described, movement of the armature cores 50a and 50b in opposite directions from their null positions provides a voltage across the output terminals 92 of the transducer 10 of the present invention equal to the total output voltages across the transformers 84a and 84b. Similarly, if the pressure to the inlet port 64a remains constant and the pressure to the inlet port 64b increases, the flat diaphragm 54b is flexed upwardly to compress the liquid within the chamber between the flat diaphragm 54b and the bellows diaphragm 42b. The compression of the liquid in the chamber between the flat diaphragm 54b and the bellows diaphragm 42b causes some of the liquid to flow into the bellows diaphragm 42b and expand the bellows diaphragm 42b. Also, some of the liquid will flow through the passage 22b into the chamber around the bellows diaphragm 42a to cause the bellows diaphragm 42a to contract. The expansion of the bellows diaphragm 42b moves the armature core 50b upwardly, and the contraction of the bellows diaphragm 42a moves the armature core 50a downwardly. The movement of the armature cores 50a and 50b in opposite directions from their null positions provides a voltage across the output terminals 92 of the transducer 10 equal to the total outputs of the transformers 84a and 84b. Thus, a change in pressure to either of the inlet ports 64a and 64b causes an expansion of one of the bellows diaphragms 42a and 42b, and a contraction of the other bellows diaphragm to move the armature cores 50a and 50b in opposite directions and provide a voltage across the output terminals 92 of the transducer 10 equal to the total of the outputs of the transformers 84a and 84b. Since the action of the increase in pressure is divided between the two bellows diaphragms 42a and 42b, each of the bellows diaphragms will move only a small amount. However, the small movement each of the bellows diaphragms produces a relatively large output of the transducer 10. Thus, the transducer 10 of the present invention uses small, stable bellows diaphragms, yet achieves relatively large electrical outputs for small changes in pressure.

Although the operation of the transducer 10 of the present invention has been described with the change in pressure to one of the inlet ports 64a and 64b being an increase in pressure, the transducer 10 will operate in a similar manner if the pressure to one of the inlet ports decreases. A decrease in pressure to one of the inlet ports is in essence an increase in pressure to the other inlet port. Also, although the operation of the transducer 10 of the present invention has been described with the armature cores 50a and 50b being initially at their null positions, the transducer 10 will operate in a similar manner with either or both of the armatures cores being initially displaced from its null position. In such an instance, the transducer 10 will have an initial voltage across its output terminals 92 depending on the displacement of the armature cores 50a and 50b. Any change in pressure to either of the inlet ports 64a and 64b will cause a movement of the armature cores 50a and 50b to change the voltage across the output terminals 92. Thus, the transducer 10 will show a change in pressure by a change in its output voltage. Furthermore, if the pressure to both of the inlet ports 64a and 64b change simultaneously, the armature cores 50a and 50b will be displaced in a manner according to the difference in the changes in the pressures so that the transducer 10 will provide a change in output corresponding to the differential pressure across the inlet ports. Thus, if both of the pressures change, but the difference between the pressures stays the same, there will be no change in the voltage across the output terminals 92 of the transducer 10.

In the use of the transducer 10 of the present invention, the output terminals 92 may be connected across an electric meter to measure the output of the transducer 10. By properly calibrating the electric meter, the meter will record the pressure or pressure differential applied to the inlet ports 64a and 64b of the transducer 10. Thus, the transducer 10 of the present invention can be used to measure pressures or pressure differentials. The transducer 10 of the present invention can also be used to control the pressure of a fluid or gas in a chamber or flow line, or the rate of flow of a fluid or gas through a flow line. For this purpose, the inlet ports 64a and 64b are connected to the chamber or flow line, and the output terminals 92 of the transducer 10 are connected through appropriate instrumentation to an electrically controlled valve leading to or within the chamber or flow line. A change in pressure in the chamber or flow line will be applied to the flat diaphragms 54a and 54b of the transducer 10 to vary the positions of the armature cores 50a and 50b, and thereby change the voltage across the output terminals 92. Such a change in the voltage across the output terminals 92 of the transducer 10 will operate the valve in a manner to compensate for the change in pressure in the chamber or flow line. Since the transducer 10 can provide output voltages of different polarity, the transducer 10 of the present invention can operate a valve to compensate for either increases or decreases in the pressure or pressure differential being measured.

Since the two transformers 84a and 84b, and the armature cores 50a and 50b are physically in parallel, any physical movement of the transducer 10 which may cause movement of the armature cores 50a and 50b will move the armature cores in the same direction. As previously stated, movement of the armature cores 50a and 50b in the same direction provides outputs from the transformers 84a and 84b which will cancel each other. Thus, movement of the armature cores 50a and 50b like distances in the same direction will have no effect on the output voltage of the transducer 10. Therefore, movement of the transducer 10 of the present invention because of such forces as gravity, vibration and shock, will not affect the output of the transducer 10 so that only changes in the pressure applied to the inlet ports 64a and 64b will be recorded as a change in the output of the transducer 10.

The transducer 10 of the present invention is provided with means to prevent changes in the pressure of the liquid medium in the chambers around the bellows diaphragms which may be caused by changes in the temperature of the liquid medium. Such pressure changes occur when the liquid medium expands or contracts upon a change in temperature thereof. The cavities 100a and 100b and the "Invar" metal rods 104 in the cavities prevent such changes in the pressure of the liquid medium. It is known that "Invar" metal does not contract or expand substantially when subjected to a change in temperature, whereas both the fluid medium and the base plate 12 in which the cavities 100a and 100b are provided, expand when heated and contract when cooled. The "Invar" metal rods 104 are each of a length and diameter as compared to the length and diameter of the cavities 100a and 100b that upon a degree increase in temperature of the transducer 10, the base plate 12 expands to increase the volume of the space in each of the cavities 100a and 100b around the rods 104 an amount equal to the increase in volume of the fluid medium. Thus, the excess fluid medium flows into the cavities 100a and 100b to prevent any increases in pressure in the chambers around the bellows diaphragms 42a and 42b because of the increase in temperature. Likewise, if the temperature of the transducer 10 decreases, the base plate 12 contracts an amount to decrase the volume of the space in the cavities 100a and 100b an amount equal to the contraction of the volume of the liquid medium. This causes a flow of the liquid medium from the cavities 100a and 100b into the chambers around the bellows diaphragms 42a and 42b to maintain the proper pressure of the fluid medium. Thus, changes in temperature of the transducer 10 have no adverse effect on the operation of the transducer 10 of the present invention.

The present invention may be embodied in other specific forms without departing from the spirit or essential attributes thereof and, accordingly, reference should be made to the appended claims, rather than to the foregoing specification as indicating the scope of the invention.

I claim:

1. A pressure transducer comprising a pair of parallel armature cores of a magnetic material, a separate differential transformer around each of said armature cores, each of said transformers including a primary winding and a pair of secondary windings, the secondary windings of each of said transformers being electrically connected in bucking series relation, the secondary windings of one of said transformers being electrically connected to the secondary windings of the other transformer in bucking series relation, the primary windings of said transformers being electrically connected in parallel, a separate pressure responsive means connected to an end of each of said armature cores and adapted to move said cores axially within said transformers upon a change in pressure applied thereto, means for applying a pressure to be measured to at least one of said pressure responsive means, and means connecting said pressure responsive means so that a change in the pressure being measured is applied to both of said pressure responsive means to move said armature cores in opposite directions.

2. A pressure transducer in accordance with claim 1 in which each of the pressure responsive means is connected to the same end of its respective armature core.

3. A pressure transducer in accordance with claim 2 in which each of the pressure responsive means is a bellows diaphragm, and the means connecting said diaphragms connects the interior of each of the diaphragms to the exterior of the other diaphragm.

4. A pressure transducer comprising a base plate having a pair of spaced enclosed chambers therein, a separate bellows diaphragm in each of said chambers, each of said bellows diaphragms having an open end and a closed end, the open end of each of the bellows diaphragms extending across its respective chamber to divide each of the chambers into two compartments, one of the compartments of each of said chambers being around the outside of the respective diaphragm and the other compartment of each of said chambers including the interior of the respective bellows, the closed ends of said bellows diaphragms extending in the same direction from the open ends of the bellows so that the bellows diaphragms are physically in parallel relation, means providing communiction between the compartment around the outside of one of said bellows and the compartment including the interior of the other bellows, separate means providing communication between the compartment including the interior of said one bellows and the compartment around the outside of said other bellows, a separate armature core of a magnetic material secured to the closed end of each of said bellows diaphragms so that the armature cores move axially upon expansion or contraction of the bellows, said armature cores being in physical parallel relation, a separate differential transformer around each of said armature cores, each of said transformers including a primary winding and a pair of secondary windings, the secondary windings of each of said transformers being electrically connected in bucking series relation, the secondary windings of one of said transformers being electrically connected to the secondary windings of the other transformer in bucking series relation, the primary windings of said transformers being electrically connected in parallel, a fluid medium filling each of the compartments of said chambers, and means for applying a pressure to be measured to at least one of the compartments including the interior of a bellows diaphragm.

5. A transducer in accordance with claim 4 in which a flat diaphragm extends across and forms a wall of the compartment to which the pressure to be measured is applied, and the pressure to be measured is applied to said flat diaphragm.

6. A transducer in accordance with claim 4 including a separate flat diaphragm extending across and forming a wall of each of the compartments which includes the interior of the bellows diaphragms, and means for applying a pressure to be measured to each of said flat diaphragms.

7. A transducer in accordance with claim 4 in which each of the armature cores is within the compartment around the outside of the bellows diaphragm to which the armature core is secured.

8. A transducer in accordance with claim 4 including means for permitting expansion or contraction of the fluid medium upon a change in temperature of the fluid medium without changing the pressure of the fluid medium against the bellows diaphragms.

9. A transducer in accordance with claim 8 in which the means for permitting expansion or contraction of the fluid medium comprises a pair of enclosed compensating cavities in said base plate, each of said cavities being in communication with a separate one of the means providing communication between said compartments, and a separate "Invar" metal rod supported in each of said compensating cavities, each of said "Invar" metal rods being of a size with respect to its cavity that upon a change in temperature of the fluid medium the volume of the space in the compensating cavities changes an amount equal to the change in volume of the fluid medium.

10. A pressure transducer comprising a substantially flat base plate, a pair of spaced cylindrical cavities in one surface of said base plate, a pair of shallow cavities in the opposite surface of said base plate, each of said shallow cavities being in alignment with a separate one of said cylindrical cavities, a separate hole extending through the base plate between the bottoms of each pair of aligned cavities so that each of said shallow cavities is in communication with one of said cylindrical cavities, a separate open ended cylinder within each of said cylindrical cavities with the cylinder chamber being open to its respective cavity, a separate bellows diaphragm in each of said cylinders, each of said bellows diaphragms having a closed end and an open end, the open end of each of said bellows diaphragms extending across and sealed to the open end of its respective cylinder so as to form a compartment within the bellows diaphragm which is open toward the bottom of its respective cylindrical cavity and a compartment within its cylindrical chamber around the bellows diaphragm, separate means providing communication between the compartment including the interior of each of said bellows diaphragms and the compartment around the other bellows diaphragm, a separate armature core of a magnetic material secured to the closed end of each of said bellows diaphragms so that the armature cores move axially upon contraction or expansion of said bellows, said armature cores being in parallel relation, a separate differential transformer around each of said armature cores, each of said transformers including a primary winding and a pair of secondary windings, the secondary windings of each of said transformers being electrically connected in bucking series relation, the secondary windings of one of said transformers being electrically connected to the secondary windings of the other transformer in bucking series relation, the primary windings of said transformers being electrically connected in parallel, a fluid medium filling each of the compartments on opposite sides of said bellows diaphragms, and means for applying a pressure to be measured to at least one of said shallow cavities in said base plate.

11. A pressure transducer in accordance with claim 10 in which the means for applying the pressure to be measured to one of the shallow cavities in the base plate comprises a flat diaphragm extending across the shallow cavity, and a cover plate extending across said flat diaphragm and clamping the periphery of said flat diaphragm to the base plate, said cover plate having an inlet port therethrough opening to said flat diaphragm.

12. A pressure transducer in accordance with claim 11 including a second flat diaphragm extending across the other shallow cavity in said base plate, and a second cover plate extending across said second flat diaphragm and clamping the periphery of said second flat diaphragm to the base plate, said second cover plate having an inlet port therethrough opening to said second flat diaphragm.

13. A pressure transducer in accordance with claim 10 in which each of said cylinders has a hole through its closed end opening into the cylinder chamber, a separate elongated tubular sleeve of a non-magnetic material having one end extending through and secured in the hole in each of said cylinders, the free end of each of said sleeves being sealed closed, each of the armature cores being within a separate one of said sleeves, and each of the transformers being mounted around a separate one of said sleeves.

14. A pressure transducer in accordance with claim 13 including a separate elongated rod of a non-magnetic material within each of the sleeves, one end of each of said rods being secured directly to the closed end of a separate bellows diaphragm, and the armature core in each of the sleeves surrounding and secured to the rod within the sleeve.

15. A pressure transducer in accordance with claim 10 in which the means providing communication between the compartments comprises a pair of passages extending through the base plate, each of said passages extending between a separate one of the holes in the base plate and the interior of the cylinder in the other base plate cavity.

16. A pressure transducer in accordance with claim 15 including means for permitting expansion or contraction of the fluid medium upon a change in temperature of the fluid medium without changing the pressure of the fluid medium against the bellows diaphragms.

17. A pressure transducer in accordance with claim 16 in which the means for permitting expansion or contraction of the fluid medium comprises a pair of enclosed compensating cavities in the base plate, each of said cavities being in communication with a separate one of the passages in the base plate, and a separate "Invar" metal rod supported in each of said compensating cavities, each of said "Invar" metal rods being of a size with respect to its cavity that upon a change in temperature of the fluid medium the volume of the space in the compensating cavities changes an amount equal to the change in volume of the fluid medium.

References Cited in the file of this patent
UNITED STATES PATENTS
2,564,221   Hornfeck _____ Aug. 14, 1951